United States Patent
Homma

(10) Patent No.: US 12,280,661 B2
(45) Date of Patent: Apr. 22, 2025

(54) VEHICLE CONTROL SYSTEM

(71) Applicant: SUBARU CORPORATION, Tokyo (JP)

(72) Inventor: Takuya Homma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 253 days.

(21) Appl. No.: 17/948,828

(22) Filed: Sep. 20, 2022

(65) Prior Publication Data
US 2023/0191907 A1 Jun. 22, 2023

(30) Foreign Application Priority Data

Oct. 1, 2021 (JP) .................................. 2021-162896

(51) Int. Cl.
B60K 28/04 (2006.01)
B60K 28/06 (2006.01)
(Continued)

(52) U.S. Cl.
CPC .............. B60K 28/04 (2013.01); B60K 28/06 (2013.01); B60R 25/01 (2013.01); B60R 25/24 (2013.01);
(Continued)

(58) Field of Classification Search
CPC ........ B60K 28/04; B60K 28/06; B60R 25/01; B60R 25/24; B60R 25/31; B60R 25/104;
(Continued)

(56) References Cited

U.S. PATENT DOCUMENTS

| 2003/0014164 A1* | 1/2003 | Shin ........................ B60R 25/24 701/2 |
| 2007/0216517 A1* | 9/2007 | Kurpinski ........... B60R 25/2036 340/8.1 |
| 2008/0150686 A1* | 6/2008 | Mackjust ............ B60R 25/2036 340/5.72 |
| 2010/0050713 A1* | 3/2010 | Nagao ................ G07C 9/00309 70/255 |

(Continued)

FOREIGN PATENT DOCUMENTS

| JP | H05624 A | * | 1/1993 |
| JP | 2000-301963 A | | 10/2000 |

(Continued)

OTHER PUBLICATIONS

Translation of JP-2010180619-A retrieved from Espacenet on Jul. 10, 2024 (Year: 2024).*

(Continued)

Primary Examiner — Thomas Ingram
Assistant Examiner — Faris Asim Shaikh
(74) Attorney, Agent, or Firm — Rimon P.C.

(57) ABSTRACT

A vehicle control system includes at least one processor and a storage medium configured to store a program to be executed by the at least one processor. The program includes at least one command. The at least one command causes the at least one processor to execute a key lock-out prevention process of controlling a lock mechanism of a door of a vehicle into an unlocked state in a case where a key that operates the lock mechanism is positioned inside the vehicle, and a vehicle protection process of controlling the lock mechanism into a locked state without executing the key lock-out prevention process in a case where, after automatic stop of the vehicle, an occupant present inside the vehicle is not detected and the key is positioned inside the vehicle.

20 Claims, 4 Drawing Sheets

(51) Int. Cl.
*B60R 25/01* (2013.01)
*B60R 25/24* (2013.01)
*B60R 25/31* (2013.01)
*E05B 77/14* (2014.01)
*E05B 81/56* (2014.01)

(52) U.S. Cl.
CPC .............. *B60R 25/31* (2013.01); *E05B 77/14* (2013.01); *E05B 81/56* (2013.01)

(58) Field of Classification Search
CPC ..... B60R 25/30; B60R 25/34; B60R 2325/30; B60R 25/406; B60R 25/018; B60R 25/014; B60R 25/016; B60R 25/002; B60R 25/00; B60R 25/20; E05B 77/14; E05B 81/56; E05B 81/64; E05B 81/58; E05B 81/72; E05B 81/74; E05B 81/76; E05B 81/78; E05B 81/77; E05B 83/36; E05B 83/44; E05B 83/42; E05B 83/38; E05B 85/10; E05B 85/00; E05B 81/00; E05B 77/00; E05B 77/16; E05B 77/18; E05B 77/20; E05B 77/22; E05B 77/02; E05B 77/44; E05B 77/54; E05B 43/00; E05B 43/005; B60W 50/12; B60Y 2400/30; B60Y 2400/306
See application file for complete search history.

(56) References Cited

U.S. PATENT DOCUMENTS

| | | | | |
|---|---|---|---|---|
| 2016/0272152 | A1* | 9/2016 | Iwata | G07C 9/00309 |
| 2018/0058109 | A1* | 3/2018 | Magnusson | E05B 77/38 |
| 2018/0283080 | A1* | 10/2018 | Tamura | B60R 25/2054 |
| 2019/0211587 | A1* | 7/2019 | Ganeshan | B60Q 5/006 |
| 2019/0225209 | A1* | 7/2019 | Seki | B62D 15/0285 |
| 2019/0344750 | A1* | 11/2019 | Takata | B60N 2/0244 |
| 2020/0130706 | A1* | 4/2020 | Rakshit | B60W 40/09 |
| 2020/0223439 | A1* | 7/2020 | Sakai | G05D 1/0055 |
| 2020/0385006 | A1* | 12/2020 | Matsumoto | B60W 40/08 |
| 2021/0122330 | A1* | 4/2021 | Sung | B60R 25/305 |
| 2022/0032905 | A1* | 2/2022 | Lee | B60N 2/0276 |
| 2022/0180746 | A1* | 6/2022 | Nakashima | B60R 25/24 |
| 2023/0060470 | A1* | 3/2023 | Park | B60R 25/1003 |
| 2023/0379676 | A1* | 11/2023 | Zhong | H04W 8/005 |

FOREIGN PATENT DOCUMENTS

| | | | | |
|---|---|---|---|---|
| JP | 2007009842 A | * | 1/2007 | |
| JP | 2010180619 A | * | 8/2010 | G07C 9/00309 |

OTHER PUBLICATIONS

Translation of JP H05624 A retrieved from Google Patents on Jul. 10, 2024 (Year: 2024).*
Translation of JP-2007009842-A retrieved from Espacenet on Jul. 10, 2024 (Year: 2024).*

* cited by examiner

VEHICLE CONTROL SYSTEM

CROSS-REFERENCE TO RELATED APPLICATIONS

This application claims priority from Japanese Patent Application No. 2021-162896 filed on Oct. 1, 2021, the entire contents of which are hereby incorporated by reference.

BACKGROUND

The disclosure relates to a vehicle control system that controls a vehicle after emergency evacuation.

A technique has been known of preventing a subsequent accident by stably stopping a vehicle in a case where a driver who is driving the vehicle becomes incapable of driving. For example, Japanese Unexamined Patent Application Publication No. 2000-301963 discloses a technique of implementing an emergency stop operation for automatically stopping a vehicle in a case of detecting an abnormal condition of a driver who is driving the vehicle.

SUMMARY

An aspect of the disclosure provides a vehicle control system to be applied to a vehicle. The vehicle control system includes at least one processor and a storage medium configured to store a program to be executed by the at least one processor. The program includes at least one command. The at least one command causes the at least one processor to execute a key lock-out prevention process of controlling a lock mechanism of a door of the vehicle into an unlocked state in a case where a key that operates the lock mechanism is positioned inside the vehicle, and a vehicle protection process of controlling the lock mechanism into a locked state without executing the key lock-out prevention process in a case where, after automatic stop of the vehicle, an occupant present inside the vehicle is not detected and the key is positioned inside the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
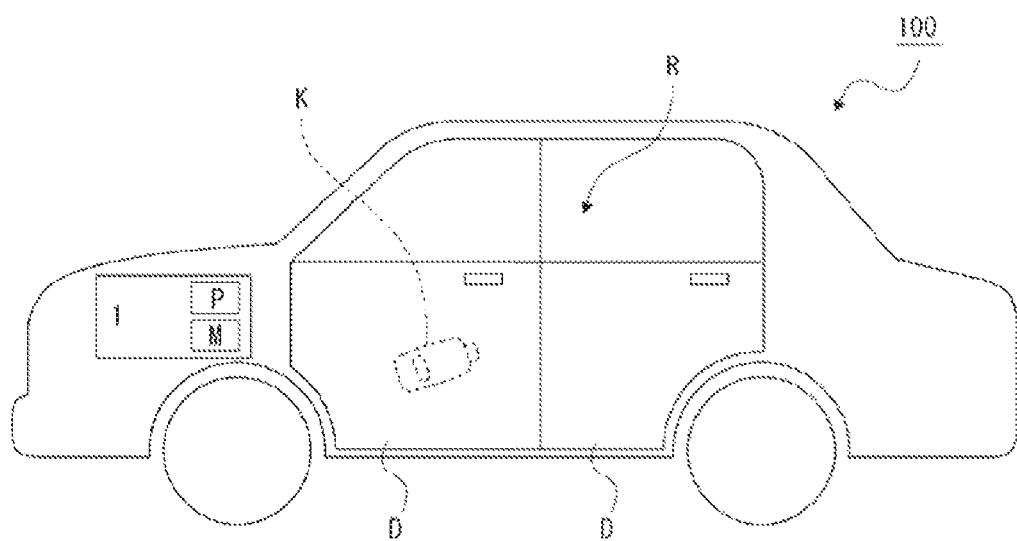
FIG. 1 is a schematic diagram illustrating a state in which a vehicle includes a vehicle control system.

In a case where evacuation of an occupant from a vehicle, such as transportation of a driver, is carried out after implementing an emergency stop operation, the vehicle can be left for a certain time or over around an accident site, which can cause, for example, theft of the vehicle.

It is desirable to provide a vehicle control system that makes it possible to prevent theft of a vehicle after emergency evacuation of an occupant from the vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. CONFIGURATION OF VEHICLE CONTROL SYSTEM

Figure 2:
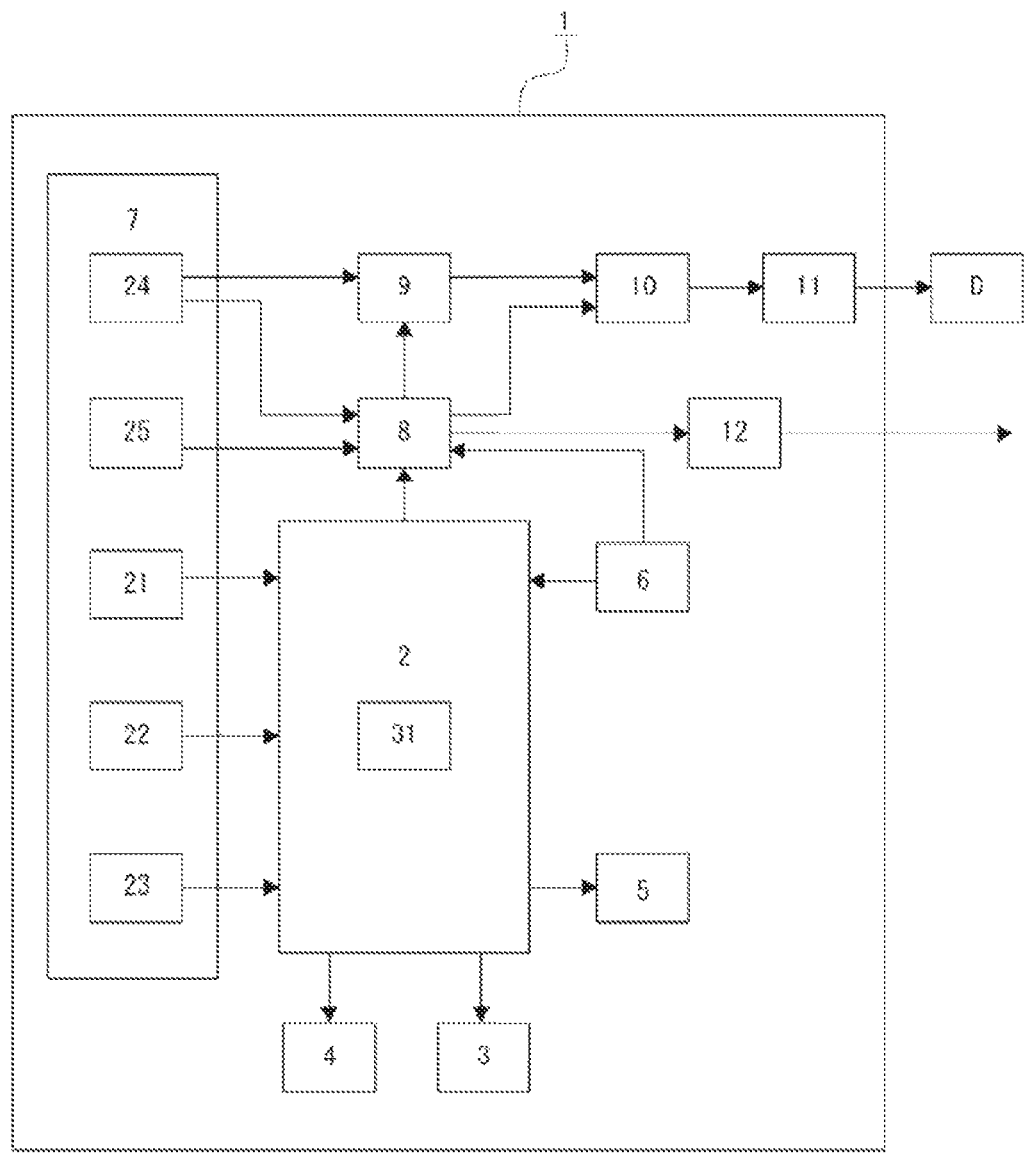
FIG. 2 is a block diagram illustrating a configuration of the vehicle control system.

Description is given of a configuration of a vehicle control system 1 included in a vehicle 100 according to an example embodiment of the disclosure with reference to FIGS. 1 and 2.

The vehicle 100 may be applied to various vehicles including a vehicle with an internal combustion engine, an electric vehicle, and a hybrid vehicle.

The vehicle 100 may include the vehicle control system 1 that performs various processes for controlling the vehicle 100 (see FIG. 1).

The vehicle control system 1 includes, for example, a processor P and a storage medium M. The processor P may include, for example, a central processing unit (CPU), and the storage medium M may include, for example, a read only memory (ROM) or a random access memory (RAM).

The vehicle 100 may include electronic control units (ECUs) as a plurality of information processing devices. Each of the ECUs may include the processor P and the storage medium M. FIG. 1 comprehensively illustrates a plurality of processors P and a plurality of storage media M included in the plurality of ECUs.

The vehicle control system 1 may detect, for example, evacuation of an occupant from a vehicle compartment R, and presence of a key K (to be described later) in the vehicle compartment R, and perform various processes to be described later in accordance with the detection. The key K locks or unlocks a door D of the vehicle 100 serving as an own vehicle.

As illustrated in FIG. 2, the vehicle control system 1 may include an automatic driving processor 2, a power source 3, a steering actuator 4, a brake-related actuator 5, a position information acquiring unit 6, and sensors 7.

The power source 3 may correspond to, for example, an engine of a vehicle with an internal combustion engine, an engine and a motor of a hybrid vehicle, or a motor of an electric vehicle.

The steering actuator 4 may be provided to change a steering angle of a power steering motor, for example, and may be subjected to steering angle control.

Non-limiting examples of the brake-related actuator 5 may include various actuators related to a brake, such as a hydraulic control actuator that controls output fluid pressure from a brake booster to a master cylinder or fluid pressure within a brake fluid pipe.

The position information acquiring unit 6 may perform a process of acquiring information for identifying a current location of the vehicle 100 serving as the own vehicle. The position information acquiring unit 6 may acquire position information with use of, for example, a global navigation satellite system (GNSS) such as a global positioning system (GPS). The position information acquiring unit 6 may be able to acquire the position information by road-to-vehicle communication, inter-vehicle communication, or image processing.

The sensors 7 may comprehensively represent various sensors to be used for control of the vehicle 100. The sensors 7 may include, for example, a vehicle outside sensor 21 that senses surroundings of the vehicle 100, and other sensors 22 including a sensor that acquires driving information of the vehicle 100, a sensor that senses a state inside the vehicle 100, and a sensor used for vehicle control.

The vehicle outside sensor 21 may be provided to sense a state outside the vehicle 100. Non-limiting examples of the vehicle outside sensor 21 may include a road surface sensor that detects a road surface state, a sensor such as an image sensor that captures images of regions in front of and behind the vehicle and on both sides of the vehicle, an outside air temperature sensor, and a millimeter wave radar.

Sensors included in the other sensors 22 and used for the vehicle control may be used for control of the vehicle 100. Non-limiting examples of the sensors may include an engine speed sensor in the vehicle 100 with an engine, an accelerator position sensor that detects the stepping quantity of an accelerator pedal as an accelerator position, an intake pressure sensor that detects intake pressure of the engine, and an exhaust pressure sensor that detects exhaust pressure.

In the vehicle 100 with a motor, the other sensors 22 may include, for example, a current sensor and a voltage sensor that monitor a battery for traveling.

In this example, a driver monitoring sensor 23 that monitors a driver who drives the vehicle 100 may be provided as a sensor that is included in the other sensors 22 and senses the state inside the vehicle 100. The driver monitoring sensor 23 will be described later.

The other sensors 22 may include, for example, an air pressure sensor that detects air pressure of a tire, an acceleration sensor, and a gyro sensor, in addition to the above sensors.

The vehicle 100 may be able to travel by controlling the power source 3, the steering actuator 4, and the brake-related actuator 5 in accordance with an operation of the driver.

The vehicle 100 may be automatically controlled by, for example, an adoptive cruise control (ACC) operation of the automatic driving processor 2.

For example, the automatic driving processor 2 may control, for example, the power source 3, the steering actuator 4, and the brake-related actuator 5 on the basis of information acquired from, for example, the vehicle outside sensor 21 and the other sensors 22 included in the sensors 7 and the position information acquiring unit 6 to allow the vehicle 100 to travel and stop.

The automatic driving processor 2 according to the example embodiment may include a stop processing unit 31.

The stop processing unit 31 may perform a process of stably decelerating and stopping the vehicle 100 in a case where it is determined that the driver of the vehicle 100 is incapable of continuing driving due to, for example, a disease or illness. For example, the stop processing unit 31 may perform a process for performing a so-called minimum risk maneuver (MRM). In the following description, automatic stop of the vehicle 100 by the MRM is referred to as "emergency stop".

The stop processing unit 31 may use the driver monitoring sensor 23 included in the sensors 7 to execute an emergency stop process.

The driver monitoring sensor 23 may include a sensor such as an image sensor that is provided to monitor the driver. The driver monitoring sensor 23 may detect, for example, the state of the driver by an image analysis process.

The image analysis process may allow for, for example, detection of whether driver's eyes are open, detection of driver's pulse, detection of a surface temperature of the driver, and detection of a posture of the driver.

It is to be noted that the driver monitoring sensor 23 may include a pulse sensor that detects the driver's pulse, and a body temperature sensor that detects a body temperature of the driver. In this case, the driver monitoring sensor 23 may not include such a sensor as the image sensor.

The driver monitoring sensor 23 may further include, for example, a microphone that detects an utterance of the driver, and a steering angle sensor that detects abnormality in a steering operation.

After the emergency stop process executed by the stop processing unit 31 causes the vehicle 100 to stop at, for example, a road shoulder, there may be a case where the driver is transported to a medical institution by, for example, an ambulance. Evacuation of an occupant from the vehicle 100 after emergency stop is referred to as "emergency evacuation". The "emergency evacuation" may encompass not only a case where the driver is evacuated from a vehicle by, for example, an ambulance attendant, but also a case where the driver is evacuated from a vehicle by himself/herself.

After the emergency evacuation, theft or break-in of the vehicle 100 can occur. To prevent this, the vehicle 100 may include a protection processor 8 that executes a vehicle protection process for protecting the vehicle 100.

The protection processor 8 may prevent theft and break-in of the vehicle 100 by controlling the door D of the vehicle 100 into a locked state in a case where a predetermined condition is established after the emergency evacuation.

Here, the protection processor 8 may perform control to turn off a key lock-out prevention operation. The key lock-out prevention operation is first described.

The vehicle 100 may accept a locking operation and an unlocking operation as a key operation of a user by communicating with a smart key (hereinafter simply referred to as "key") to perform a process of controlling the door D into the locked state and a process of releasing the locked state.

If the door D is controlled into the locked state in a state in which the key K is positioned inside the vehicle 100, the vehicle 100 can be turned to a state called key lock-out, in which a user is not able to release the locked state of the vehicle 100.

The vehicle 100 may include a key lock-out prevention unit 9 to implement an operation for preventing key lock-out.

The key lock-out prevention unit 9 may receive a detection signal from a key position detector 24 included in the sensors 7, and estimate the position of the key K on the basis of the detection signal. In the estimation of the position of the key K, for example, whether the key K is positioned inside or outside the vehicle 100 may be estimated.

The key lock-out prevention unit 9 may determine whether to accept a locking operation for controlling the door D into the locked state in accordance with the estimated position of the key K.

In a case where the key lock-out prevention unit 9 estimates that the key K is positioned inside the vehicle 100, the key lock-out prevention unit 9 may refrain from accepting some locking operations. Non-limiting examples of these locking operations may include a locking operation to be performed by pressing a button provided on an outer handle mounted on the outside of a door.

To implement the key lock-out prevention operation, the key lock-out prevention unit 9 may transmit, to a lock mechanism processor 10, a command not to control the door D into the locked state.

The lock mechanism processor 10 may output a control signal for controlling a lock mechanism 11 provided for each door D into the locked state or a control signal for controlling the lock mechanism 11 into the unlocked state.

Accordingly, in a case where the command not to control the door D into the locked state is transmitted from the key lock-out prevention unit 9 to the lock mechanism processor 10, the lock mechanism processor 10 may not output, to the lock mechanism 11, the control signal for controlling the door D into the locked state, or may output, to the lock mechanism 11, the control signal for controlling the door D into the unlocked state.

The lock mechanism 11 may control the door D into the locked state or the unlocked state on the basis of the received control signal.

Description returns to the protection processor 8.

In a case where the key K is left inside the vehicle 100 even after the emergency evacuation, the key lock-out prevention operation described above may work, which can lose control of the door D into the locked state.

Accordingly, in a case where the predetermined condition is established, the key lock-out prevention operation to be executed by the key lock-out prevention unit 9 may be turned off, thus making it possible to control the lock mechanism 11 of the door D into the locked state.

To determine whether the predetermined condition is established, the protection processor 8 may receive detection signals outputted from the key position detector 24 and an occupant detector 25 included in the sensors 7.

The occupant detector 25 may be provided as a sensor that detects whether an occupant is present inside the vehicle 100. Non-limiting examples of the occupant detector 25 may include an image sensor that acquires a captured image, and a pressure sensor provided in a seat for detecting an occupant sitting on the seat.

After execution of the emergency stop process, if the protection processor 8 receives, from the occupant detector 25, a signal indicating that no occupant is present inside the vehicle 100 in spite of receiving, from the key position detector 24, a signal indicating that the key K is positioned inside the vehicle 100, the protection processor 8 may turn off the key lock-out prevention operation.

Thus, no command from the key lock-out prevention unit 9 may be transmitted to the lock mechanism processor 10. Instead of this, the protection processor 8 may transmit, to the lock mechanism processor 10, a command to control the door D into the locked state at a predetermined timing. In response to this command, the lock mechanism processor 10 may output a control signal for controlling the lock mechanism 11 into the locked state.

A command to control the lock mechanism 11 into the locked state may be transmitted from the protection processor 8 without a command to control the lock mechanism 11 into the unlocked state being transmitted from the key lock-out prevention unit 9, which may cause the lock mechanism 11 to lock the door D of, for example, the vehicle 100 left after the driver is transported. This makes it possible to protect the vehicle 100 after emergency stop.

The vehicle control system 1 may include a communication unit 12 as illustrated in FIG. 2.

The communication unit 12 may transmit and receive information to and from another information processing device such as a server device provided outside the vehicle 100, and other vehicles, for example.

The protection processor 8 may be able to perform a process for releasing the locked state of the lock mechanism 11 by a vehicle protection operation. In one example, the protection processor 8 may be able to transmit unlock information for releasing the locked state of the lock mechanism 11 via the communication unit 12.

The protection processor 8 may perform a process of releasing the locked state of the door D by the vehicle protection operation upon receiving the unlock information inputted. This makes it possible to release the locked state of the lock mechanism 11 and open the door D.

The unlock information may be transmitted to, for example, a preset wrecker service. The wrecker service may be able to release the locked state of the door D by inputting or transmitting the unlock information to the vehicle 100 when performing a wrecking operation or a towing operation of the vehicle 100.

This makes it possible to efficiently perform the wrecking operation or the towing operation of the vehicle 100.

Setting of a destination of the unlock information may be executed, for example, when performing a setting process of setting the vehicle protection operation to ON. In a case where the information about the destination of the unlock information is not set, the vehicle protection operation may not be settable to ON.

Each of the automatic driving processor 2, the protection processor 8, the key lock-out prevention unit 9, the lock mechanism processor 10, and the communication unit 12 described above may serve as an information processing device such as an ECU including, for example, the processor P and the storage medium M. Each of these units may be configured as an independent ECU, or a single ECU may serve as two or more of these units.

2. PROCESS FLOW

Figure 3:
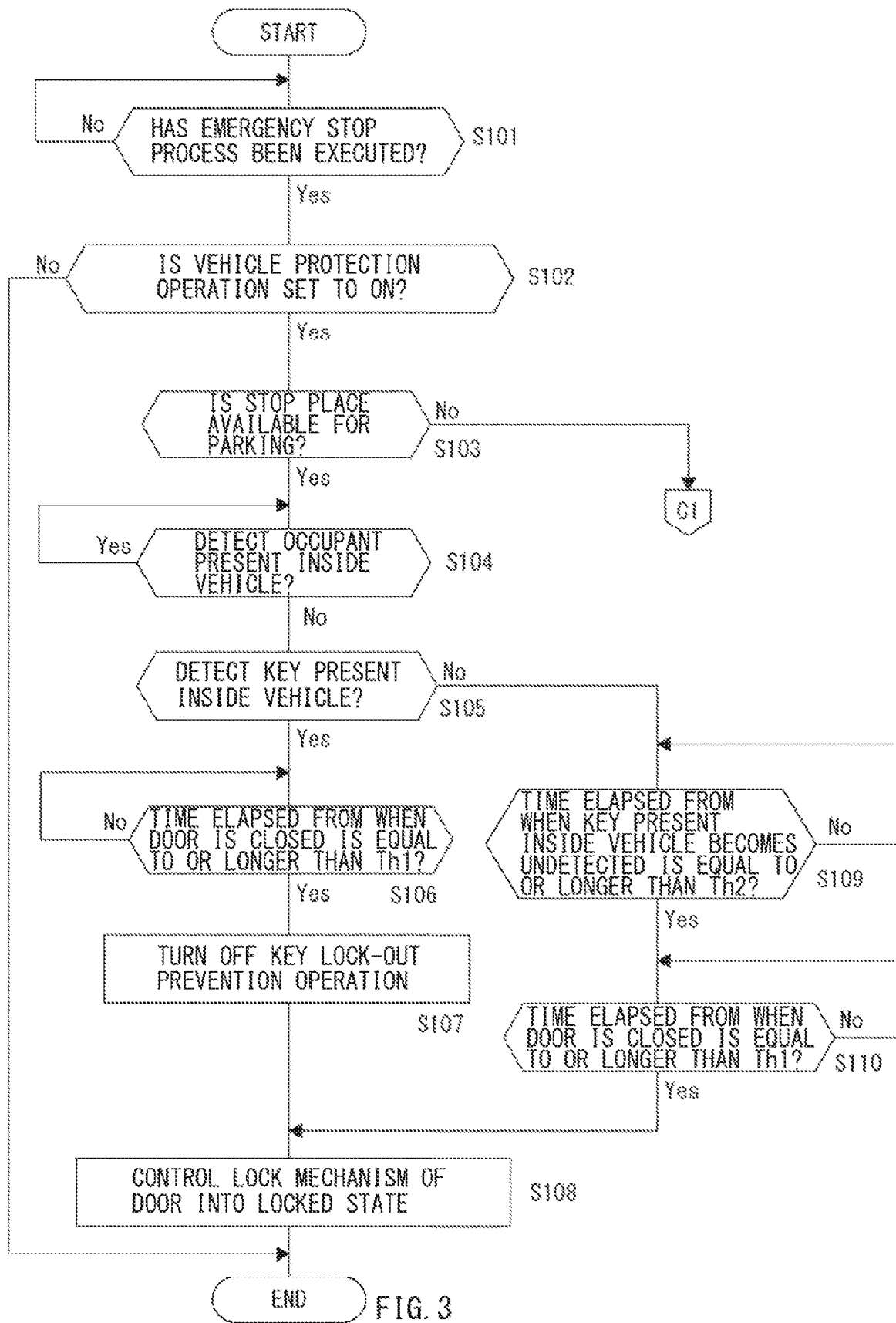
FIG. 3 illustrates, together with FIG. 4, an example of a flowchart of a vehicle protection process.

Description is given of the flow of a process to be executed by the processor P of the protection processor 8 of the vehicle control system 1 included in the vehicle 100 to execute the operations described above with reference to FIGS. 3 and 4. One flowchart is divided into FIGS. 3 and 4, and connection of a process path of the flowchart is indicated by connectors C1.

The processor P of the protection processor 8 may determine whether the emergency stop process has been executed in step S101. The emergency stop process may be executed by the automatic driving processor 2 in response to, for example, detection of a case where the driver falls into a driving incapable state or a state in which it is difficult for the driver to continue driving. The detection of the driving incapable state, etc. may be performed on the basis of, for example, output of the driver monitoring sensor 23.

The process in step S101 may be repeatedly executed at predetermined time intervals such as several milliseconds or several hundred milliseconds until the emergency stop process is executed.

In a case where it is determined that the emergency stop process has been executed (S101: Yes), the processor P of the protection processor 8 may determine whether the vehicle protection operation is set to ON in step S102. In a case where the vehicle protection operation is set to OFF (S102: No), the process may end without executing remaining processes illustrated in FIGS. 3 and 4. In this case, protection of the vehicle 100 by locking the door D may not be performed.

Meanwhile, in a case where the vehicle protection operation is set to ON (S102: Yes), after waiting until the emergency stop process of the vehicle 100 ends, the processor P of the protection processor 8 may determine whether a stop place of the vehicle 100 is available for parking, i.e., whether the stop place of the vehicle 100 is a parking prohibited place, in step S103.

The determination of whether the stop place of the vehicle 100 is available for parking may be performed with use of, for example, a GPS or a map locator, or may be performed by detecting, for example, a no-parking sign by image analysis of a captured image acquired from an imaging device serving as the vehicle outside sensor 21.

In a case where it is determined that the stop place of the vehicle 100 is available for parking (S103: Yes), the processor P of the protection processor 8 may determine whether an occupant present inside the vehicle 100 is detected in step S104.

While the occupant present inside the vehicle 100 is detected (S104: Yes), the processor P of the protection processor 8 may repeatedly execute the determination process in step S104.

Meanwhile, in a case where it is determined that no occupant present inside the vehicle 100 is detected (S104: No), that is, in a case where it is determined that emergency evacuation of an occupant has been done, the processor P of the protection processor 8 may determine whether the key K present inside the vehicle 100 is detected in step S105. In a case where the key K present inside the vehicle 100 is detected (S105: Yes), the processor P of the protection processor 8 may determine whether a time elapsed from when the door D is closed is equal to or longer than a threshold Th1 in step S106.

In a case where the time elapsed from when the door D is closed is shorter than the threshold Th1 (S106: No), the processor P of the protection processor 8 may repeatedly execute the process in step S106. In other words, the process in step S106 may be a process of waiting until a time equal to or longer than the threshold Th1 elapses from when the door D is closed.

In a case where the time equal to or longer than the threshold Th1 does not elapse from when the door D is closed, it may be assumed that someone is still present around the vehicle 100 or someone is to pick up baggage inside the vehicle 100.

In one example, the threshold Th1 in the process in step S106 may accordingly be set to a time of, for example, 10 minutes or 30 minutes taken for people to leave from surroundings of the vehicle 100 or a time until it becomes unlikely that a transported occupant returns to pick up baggage.

In a case where it is determined that the time elapsed from when the door D is closed is equal to or longer than the threshold Th1 (S106: Yes), the processor P of the protection processor 8 may control the key lock-out prevention operation to OFF in step S107, and thereafter perform a process of controlling the lock mechanism 11 of the door D into the locked state in step S108.

Controlling the key lock-out prevention operation to OFF makes it possible to control the lock mechanism 11 of the door D into the locked state, thus making it possible to prevent theft and break-in of the vehicle 100.

The description returns to branching in step S105.

In step S105, in a case where the key K present inside the vehicle 100 is not detected (S105: No), the processor P of the protection processor 8 may cause the process to proceed to step S109.

In step S109, the processor P of the protection processor 8 may determine whether a time elapsed from when the key K present inside the vehicle 100 becomes undetected is equal to or longer than a threshold Th2.

The processor P of the protection processor 8 may wait in the process in step S109 until the time elapsed from when the key K present inside the vehicle 100 becomes undetected becomes equal to or longer than the threshold Th2, and thereafter determine whether the time elapsed from when the door D is closed is equal to or longer than the threshold Th1 in step S110.

In a case where it is determined in step S109 that the time elapsed from when the key K present inside the vehicle 100 becomes undetected is equal to or longer than the threshold Th2 (S109: Yes) and it is determined in step S110 that the time elapsed from when the door D is closed is equal to or longer than the threshold Th1 (S110: Yes), the processor P of the protection processor 8 may perform the process of controlling the lock mechanism 11 of the door D into the locked state in step S108.

The processes in step S109 and step S110 may be provided in consideration of a situation such as picking up baggage inside the vehicle 100. For example, the processes may be provided to avoid inconvenience resulting from bringing the key K out of the vehicle 100 and turning the lock mechanism 11 into the locked state at the instant of closing the door D.

The description returns to step S103.

In a case where it is determined in step S103 that the stop place of the vehicle 100 is not available for parking (S103: No), e.g., in a case where it is determined that the vehicle 100 stops at a parking prohibited place, the processor P of the protection processor 8 may proceed to step S111 in FIG. 4, and transmit unlock information to a specified destination.

Thereafter, the processor P of the protection processor 8 may control the lock mechanism 11 of the door D into the locked state in step S112.

It is to be noted that a waiting time until a predetermined time elapses may be provided before executing the processes in step S111 and step S112. Alternatively, the process in step S104 in FIG. 3 may be executed before the process in step S111, thereby causing the process in step S111 to be executed in a case where no occupant present inside the vehicle 100 is detected.

Further, the process in step S105 may be executed before executing the processes in step S111 and step S112, and in a case where the key K present inside the vehicle 100 is detected, the processes in step S106 and step S107 may be performed to perform a process of turning off the key lock-out prevention operation.

It is to be noted that an expiration period may be set for the unlock information. In one example, the expiration period may be set to several hours or several ten hours in consideration of, for example, a time until a wrecker service arrives at a site.

Alternatively, the expiration period may be set to a time corresponding to the position of a vehicle to be wrecked.

After executing the process in step S112, the processor P of the protection processor 8 may wait for input of the unlock information in step S113. In a case where it is determined that the unlock information has been inputted (S113: Yes), the processor P of the protection processor 8 may perform a process of controlling the lock mechanism 11 of the door D into the unlocked state in step S114. Thus, for example, the wrecker service who has performed the input of the unlock information may be able to release the lock state of the door D and easily perform a wrecking operation.

It is to be noted that the processor P included in the ECU other than the processor P of the protection processor 8 may execute some or all of the processes described above. For example, the processor P of the ECU serving as the lock mechanism processor 10 may execute the processes in steps S108, S112, and S114. In this case, the processor P of the protection processor 8 may give an instruction to the lock mechanism processor 10 in each of the processes.

The processor P of the ECU serving as the communication unit 12 that performs a process regarding communication may execute the process in step S111. In this case, the processor P of the protection processor 8 may give a transmission instruction to the communication unit 12 in step S111.

3. CONCLUSION

As described above, the vehicle control system 1 included in the vehicle 100 includes at least one processor (the processor P of the protection processor 8) and a storage medium (the storage medium M of the protection processor 8) configured to store a program to be executed by the at least one processor. The program includes at least one command. The at least one command causes the at least one processor to execute a key lock-out prevention process of controlling the lock mechanism 11 of the door D of a vehicle (the vehicle 100) into an unlocked state in a case where the key K (smart key) that operates the lock mechanism 11 is positioned inside the vehicle 100, and a vehicle protection process of controlling the lock mechanism 11 into a locked state without executing the key lock-out prevention process in a case where, after automatic stop of the vehicle, an occupant present inside the vehicle 100 is not detected and the key K is positioned inside the vehicle 100.

This makes it possible to achieve both the key lock-out prevention operation and the vehicle protection operation.

Accordingly, it is possible to reduce a possibility that theft of the vehicle 100 occurs, for example, in a case where an occupant is away from the vehicle 100 after automatic stop.

As described above, the at least one command may cause the at least one processor to execute, as the vehicle protection process, a process of controlling the lock mechanism 11 into the locked state after a lapse of a predetermined time (threshold Th1) in a case where, after the automatic stop, both the occupant and the key K present inside the vehicle 100 are undetected and the lock mechanism 11 is in the unlocked state.

Thus, for example, the door D of the vehicle 100 may be controlled into the locked state, even if the vehicle 100 is left at a site, for example, in a case where the driver has had a seizure to become incapable of continuing driving and has been transported by an ambulance.

This makes it possible to reduce a possibility that theft or break-in of the vehicle 100 occurs. The term "after a lapse of a predetermined time" may indicate a time point when the predetermined time has elapsed from a certain reference timing as a starting point. Non-limiting examples of the reference timing may include a timing at which execution of an automatic stop process of the vehicle 100 starts, a timing at which the vehicle 100 stops, a timing at which all occupants go out of the vehicle 100, and a timing at which the door D of the vehicle 100 is closed.

The predetermined time may be, for example, several ten minutes to several hours in a case where the reference timing is the timing at which execution of the automatic stop process of the vehicle 100 starts or the timing at which the vehicle 100 stops, and may be, for example, several minutes to several hours in a case where the reference timing is the timing at which all occupants go out of the vehicle 100 or the timing at which the door D of the vehicle 100 is closed.

As described above, the at least one command may cause the at least one processor to execute a process of determining whether a stop position of the vehicle (vehicle 100) is a parking prohibited position in an automatic stop process (emergency stop process) of automatically stopping the vehicle 100, and a transmission process of transmitting unlock information to a specified destination, together with the vehicle protection process, in a case where the stop position is determined as being the parking prohibited position, the unlock information allowing for release of the locked state of the lock mechanism 11.

In a case where the vehicle 100 has stopped at the parking prohibited position, it may be appropriate to move the vehicle 100. This configuration makes it possible to transmit information allowing for release of the locked state of the lock mechanism 11 to, for example, a wrecker service in a case where the vehicle 100 has stopped at a parking prohibited position.

This allows an operator for wrecking who has received the unlock information to perform, for example, releasing of a parking brake by opening the door D, which makes it possible to easily perform a wrecking operation.

As described above, the at least one command may cause the at least one processor to execute a setting process of setting whether to execute the vehicle protection process. Non-limiting examples of the setting process may include a process of setting the vehicle protection operation to ON and a process of setting the destination of the unlock information.

This makes it possible to predetermine whether to execute the vehicle protection process for preventing, for example, theft of the vehicle 100 after the automatic stop process is performed due to, for example, a case where the driver falls into a serious condition.

This makes it possible to prevent the vehicle protection process from being executed for a user who does not want the vehicle protection process. Thus, it is possible to execute an appropriate process that meets user's demand.

As described above, the at least one command may cause the at least one processor to execute the vehicle protection process in a case where the vehicle (vehicle 100) automatically stops by the automatic stop process (emergency stop process) executed in response to detection of a state in which the driver is incapable of driving.

Executing the automatic stop process in a case of detecting the state in which the driver is incapable of driving makes it possible to prevent a subsequent accident.

Further, the vehicle protection process of controlling the door D into the locked state may be executable after the automatic stop process, which makes it possible to prevent, for example, theft of the vehicle 100.

Figure 4:
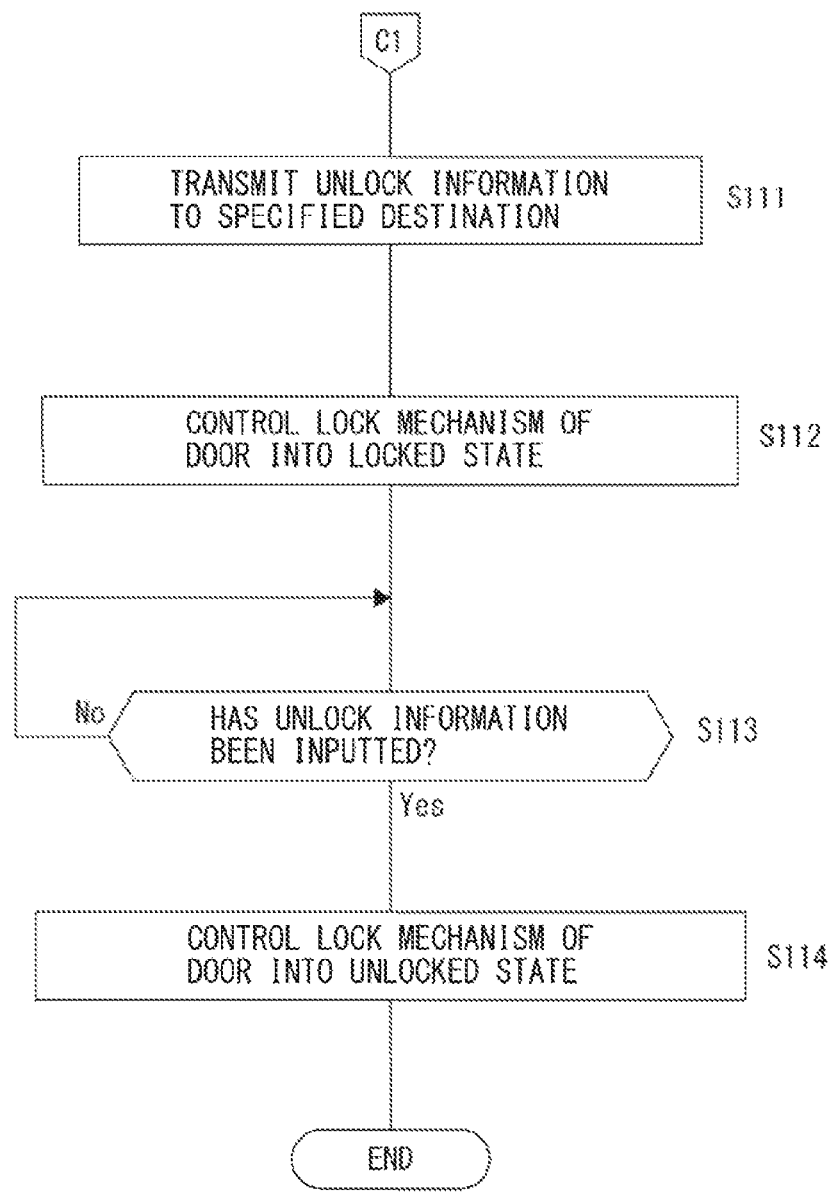
FIG. 4 illustrates the example of the flowchart of the vehicle protection process.

In the above example, description has been given of transmitting the unlock information to the specified destination in step S111 in FIG. 4 in a case where it is determined that the vehicle 100 stops at a parking prohibited place.

In addition, even in a case where the lock mechanism 11 of the door D is controlled into the locked state in the process in step S108 after the vehicle 100 stops at a parking allowed place, the vehicle 100 may be able to be moved to a more appropriate place.

In one example, the unlock information may be transmitted to, as a destination, a contact such as a reliable person or facility for the driver with execution of the process in step S108.

Information about such a destination may be preset by the driver.

Various examples described above may be appropriately combined.

According to an embodiment of the disclosure, it is possible to prevent theft of a vehicle after emergency evacuation of an occupant.

The processor P illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor P illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor P illustrated in FIG. 1.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The invention claimed is:

1. A vehicle control system to be applied to a vehicle, the vehicle control system comprising:
    at least one processor; and
    a memory configured to store a program to be executed by the at least one processor, wherein
    the program comprises at least one command, and
    the at least one command causes the at least one processor to execute:
        a key lock-out prevention process of controlling a lock mechanism of a door of the vehicle to remain in an unlocked state in a case where a key for operating the lock mechanism is positioned inside the vehicle; and
        a vehicle protection process of controlling the lock mechanism to enter a locked state without executing the key lock-out prevention process in a case where, after automatic stop of the vehicle, no occupant is detected inside the vehicle and the key is positioned inside the vehicle.

2. The vehicle control system according to claim 1, wherein the at least one command causes the at least one processor to execute, as the vehicle protection process, a process of controlling the lock mechanism to enter the locked state after a lapse of a predetermined time in a case where, after the automatic stop, both (1) neither the occupant nor the key is detected inside the vehicle and (2) the lock mechanism is in the unlocked state.

3. The vehicle control system according to claim 1, wherein the at least one command causes the at least one processor to execute:
    a determination process of determining whether a stop position of the vehicle is a parking prohibited position in an automatic stop process of automatically stopping the vehicle; and
    a transmission process of transmitting unlock information to a specified destination, together with the vehicle protection process, in a case where the stop position is determined as being the parking prohibited position, the unlock information allowing for release of the locked state of the lock mechanism.

4. The vehicle control system according to claim 2, wherein the at least one command causes the at least one processor to execute:
    a determination process of determining whether a stop position of the vehicle is a parking prohibited position in an automatic stop process of automatically stopping the vehicle; and
    a transmission process of transmitting unlock information to a specified destination, together with the vehicle protection process, in a case where the stop position is determined as being the parking prohibited position, the unlock information allowing for release of the locked state of the lock mechanism.

5. The vehicle control system according to claim 1, wherein the at least one command causes the at least one processor to execute a setting process of setting whether to execute the vehicle protection process.

6. The vehicle control system according to claim 2, wherein the at least one command causes the at least one processor to execute a setting process of setting whether to execute the vehicle protection process.

7. The vehicle control system according to claim 3, wherein the at least one command causes the at least one processor to execute a setting process of setting whether to execute the vehicle protection process.

8. The vehicle control system according to claim 4, wherein the at least one command causes the at least one processor to execute a setting process of setting whether to execute the vehicle protection process.

9. The vehicle control system according to claim 1, wherein the automatic stop of the vehicle includes stopping the vehicle through a process that responds to detecting driver's inability to continue driving.

10. The vehicle control system according to claim 2, wherein the automatic stop of the vehicle includes stopping the vehicle through a process that responds to detecting driver's inability to continue driving.

11. The vehicle control system according to claim 3, wherein the automatic stop of the vehicle includes stopping the vehicle through a process that responds to detecting driver's inability to continue driving.

12. The vehicle control system according to claim 4, wherein the automatic stop of the vehicle includes stopping the vehicle through a process that responds to detecting driver's inability to continue driving.

13. The vehicle control system according to claim 5, wherein the automatic stop of the vehicle includes stopping the vehicle through a process that responds to detecting driver's inability to continue driving.

14. The vehicle control system according to claim 6, wherein the automatic stop of the vehicle includes stopping the vehicle through a process that responds to detecting driver's inability to continue driving.

15. The vehicle control system according to claim 7, wherein the automatic stop of the vehicle includes stopping the vehicle through a process that responds to detecting driver's inability to continue driving.

16. The vehicle control system according to claim 8, wherein the automatic stop of the vehicle includes stopping the vehicle through a process that responds to detecting driver's inability to continue driving.

17. A vehicle control system to be applied to a vehicle, the vehicle control system comprising a circuitry configured to:
   execute a key lock-out prevention process of controlling a lock mechanism of a door of the vehicle to remain in an unlocked state in a case where a key for operating the lock mechanism is positioned inside the vehicle;
   execute an emergency stop process to stop the vehicle in response to detecting of a state in which a driver who drives the vehicle is incapable of driving;
   determine whether the emergency stop process has been executed;
   in response to determining that the emergency stop process has been executed, determine whether an occupant is detected inside the vehicle;
   in response to determining that no occupant is detected inside the vehicle, determine whether a key that operates a lock mechanism of a door of the vehicle is detected inside the vehicle;
   in response to determining that the key is detected inside the vehicle, determine whether an elapsed time since the door was closed after executing the emergency stop process is equal to or greater than a predetermined threshold; and
   in response to determining that the elapsed time is equal to or greater than the predetermined threshold, execute a vehicle protection process of controlling the locking mechanism to enter a locked state without executing the key lock-out prevention process.

18. A vehicle control system to be applied to a vehicle, the vehicle control system comprising a circuitry configured to:
   execute a key lock-out prevention process of controlling a lock mechanism of a door of the vehicle to remain in an unlocked state in a case where a key for operating the lock mechanism is positioned inside the vehicle;
   execute an emergency stop process to stop the vehicle in response to detecting of a state in which a driver who drives the vehicle is incapable of driving;
   determine whether the emergency stop process has been executed;
   in response to determining that the emergency stop process has been executed,
   determine whether a parking spot is available for the vehicle;
   in response to determining that the parking spot is available for the vehicle, determine whether an occupant is detected inside the vehicle;
   in response to determining that no occupant is detected inside the vehicle, determine whether a key that operates a lock mechanism of a door of the vehicle is detected inside the vehicle;
   in response to determining that the key is detected inside the vehicle, determine whether an elapsed time since the door was closed after executing the emergency stop process is equal to or greater than a predetermined first threshold; and
   in response to determining that the elapsed time is equal to or greater than the predetermined first threshold, execute a vehicle protection process of controlling the locking mechanism to enter a locked state without executing the key lock-out prevention process.

19. The vehicle control system according to claim 18, wherein the circuitry is further configured to:
   in response to determining that no key is detected inside the vehicle, (a) control the locking mechanism to the locked state in a case where (1) an elapsed time since the key was last detected inside the vehicle is equal to or greater than a predetermined second threshold, and (2) the elapsed time since the door was closed after executing the emergency stop process is equal to or greater than the predetermined first threshold; and (b) control the locking mechanism to remain in an unlocked state in a case where (1) the elapsed time since the key was last detected in the vehicle is less than the predetermined second threshold, or (2) the elapsed time since the door was closed after executing the emergency stop process is less than the predetermined first threshold.

20. The vehicle control system according to claim 19, wherein the circuitry is further configured to:
   in response to determining that the parking spot is unavailable for the vehicle, transmit an unlock information to a specified destination and control the locking mechanism to the locked state, the unlock information allowing for release of the locked state of the lock mechanism.

* * * * *